United States Patent
Bonzini et al.

(10) Patent No.: US 9,715,410 B2
(45) Date of Patent: Jul. 25, 2017

(54) PROTECTED VIRTUAL MACHINE FUNCTION ACCESS

(71) Applicant: Red Hat Israel, Ltd., Ra'anana (IL)

(72) Inventors: Paolo Bonzini, Milan (IT); Michael Tsirkin, Ra'anana (IL)

(73) Assignee: Red Hat Israel, Ltd., Ra'Anana (IL)

( * ) Notice: Subject to any disclaimer, the term of this patent is extended or adjusted under 35 U.S.C. 154(b) by 57 days.

(21) Appl. No.: 14/610,736

(22) Filed: Jan. 30, 2015

(65) Prior Publication Data
US 2016/0224383 A1 Aug. 4, 2016

(51) Int. Cl.
G06F 12/10 (2016.01)
G06F 9/455 (2006.01)
G06F 9/50 (2006.01)
G06F 12/1009 (2016.01)

(52) U.S. Cl.
CPC ........ *G06F 9/5016* (2013.01); *G06F 9/45558* (2013.01); *G06F 12/1009* (2013.01); *G06F 2009/45583* (2013.01); *G06F 2009/45587* (2013.01); *G06F 2212/65* (2013.01)

(58) Field of Classification Search
None
See application file for complete search history.

(56) References Cited

U.S. PATENT DOCUMENTS

| 8,271,450 | B2 | 9/2012 | Horovitz et al. | |
| 8,370,559 | B2* | 2/2013 | Schoenberg | G06F 9/45558 711/163 |
| 8,387,046 | B1 | 2/2013 | Montague et al. | |
| 8,656,482 | B1 | 2/2014 | Tosa et al. | |
| 2004/0083481 | A1* | 4/2004 | Shultz | G06F 9/45533 719/312 |
| 2004/0186876 | A1* | 9/2004 | Brandstatter | G06F 9/45533 709/200 |
| 2006/0036830 | A1* | 2/2006 | Dinechin | G06F 21/79 711/200 |
| 2006/0161719 | A1* | 7/2006 | Bennett | G06F 9/45533 711/6 |
| 2009/0300612 | A1* | 12/2009 | Devine | G06F 12/1009 718/1 |
| 2010/0229168 | A1* | 9/2010 | Maeda | G06F 1/3203 718/1 |
| 2011/0078361 | A1* | 3/2011 | Chen | G06F 12/145 711/6 |

(Continued)

OTHER PUBLICATIONS

Jun Nakajima, "Intel Update", Published Aug. 27-28, 2012, 7 pgs, http://www.slideshare.net/xen.com_mgr/intel-update.

(Continued)

*Primary Examiner* — Yaima Rigol
(74) *Attorney, Agent, or Firm* — Haynes and Boone, LLP (57) ABSTRACT

Methods, systems, and computer program products for accessing a protected function are provided. A computer-implemented method includes allocating and initializing a guest virtual address for a virtual machine function. A user bit and a valid bit are configured to protect a page associated with the guest virtual address. Once the user bit and the valid bit are configured, the virtual machine function is mapped to the guest virtual address. Supervisor mode is requested in order to access the virtual machine function. In supervisor mode, the virtual machine function is validated and executed.

20 Claims, 5 Drawing Sheets

(56) References Cited

U.S. PATENT DOCUMENTS

| | | | |
|---|---|---|---|
| 2011/0145916 A1* | 6/2011 | Mckenzie | G06F 21/83 |
| | | | 726/19 |
| 2012/0011508 A1* | 1/2012 | Ahmad | G06F 12/1009 |
| | | | 718/1 |
| 2013/0159663 A1* | 6/2013 | Levenglick | G06F 12/1036 |
| | | | 711/206 |
| 2013/0212575 A1* | 8/2013 | Ito | G06F 12/1475 |
| | | | 718/1 |
| 2013/0276057 A1 | 10/2013 | Smith et al. | |
| 2014/0013326 A1 | 1/2014 | Neiger et al. | |
| 2014/0173628 A1 | 6/2014 | Ramakrishna | |
| 2014/0283056 A1 | 9/2014 | Bachwani et al. | |
| 2014/0337836 A1* | 11/2014 | Ismael | G06F 9/455 |
| | | | 718/1 |

OTHER PUBLICATIONS

Abhinav Srivastava et al., Kernel Data Integrity Protection via Memory Access Control, School of Computer Science, Georgia Institute of Technology, 2014, 20 pgs.

David Durham, Mitigating Exploits, Rootkits and Advanced Persistent Threats, Copyright 2013- 2014, 39 pgs.

* cited by examiner

PROTECTED VIRTUAL MACHINE FUNCTION ACCESS

BACKGROUND

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

BRIEF SUMMARY

According to an example, a method includes allocating a guest virtual address for a virtual machine function. The method further includes initializing the guest virtual address, the initializing including mapping the guest virtual address to a guest physical address. The method further includes clearing a user bit associated with the guest virtual address. The method further includes setting a valid bit associated with the guest virtual address. The method further includes mapping the virtual machine function to the guest virtual address. The method further includes requesting entry into a supervisor mode from a user mode. The method further includes, while in the supervisor mode, validating a parameter of the virtual machine function and executing the virtual machine function.

According to an example, a non-transitory computer-readable medium includes instructions for allocating a virtual address range for a virtual machine function and initializing the virtual address range. The medium further includes instructions for toggling a user bit and a valid bit corresponding to the virtual address range. The medium further includes instructions for mapping the virtual machine function to the virtual address range. The medium further includes instructions for validating a parameter of the virtual machine function and executing the virtual machine function.

According to an example, a system includes at least one processor in communication with a memory. The system further includes a page that is a subset of the memory. The system further includes a page table entry that corresponds to the page. The system further includes a guest that allocates and initializes the page for a virtual machine function. The system further includes a host that runs the guest. The system further includes a supervisor mode that is entered by the guest in order to validate the virtual machine function and execute the virtual machine function.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Figure 1:
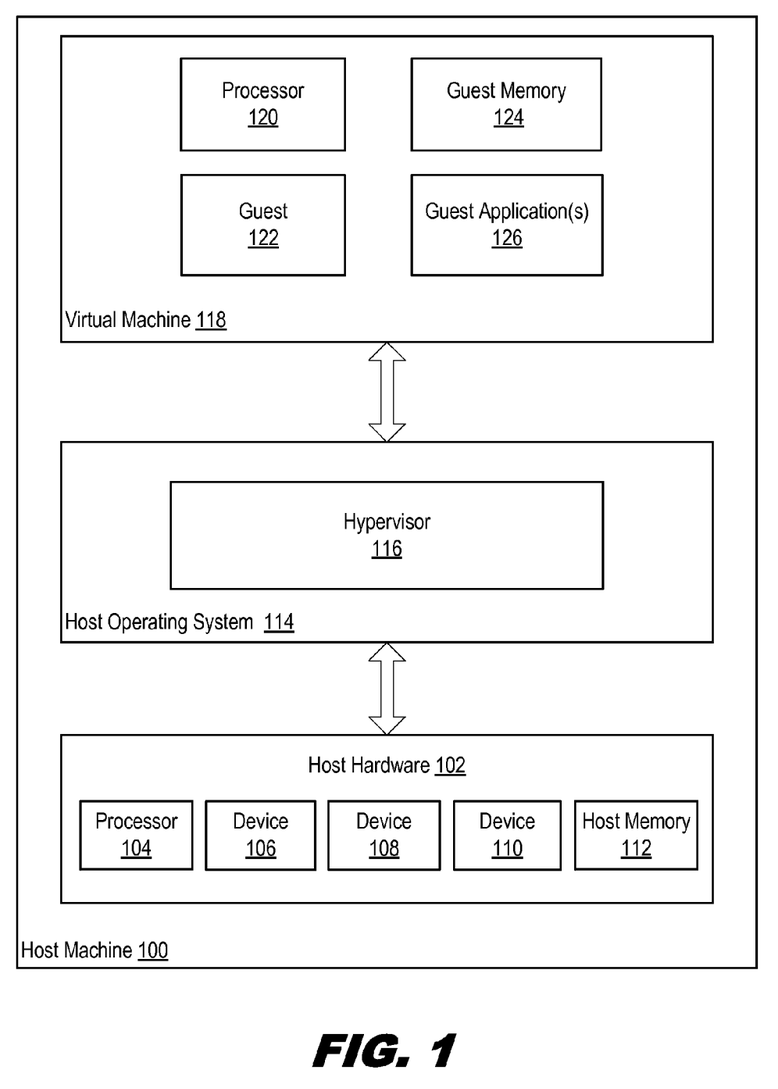
FIG. 1 is a block diagram showing an illustrative host system, in accordance with various examples of the present disclosure.

FIG. 1 is a block diagram that illustrates an example of physical computer system that hosts one or more virtual machines. The physical computer system is referred to herein as a host machine 100.

Host machine 100 includes host hardware 102, which includes a processor 104, devices 106, 108 and 110, host memory 112, and other hardware components. Host machine 100 may include a single machine or multiple host machines arranged in a cluster.

The term "processor" may refer to one processor or multiple processors arranged in a cluster. Each processor may be a processor core of a microprocessor, a central processing unit (CPU), and so forth. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Each of the devices 106, 108 and 110 may be a physical device that is internal or external to host machine 100. Some examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, and so forth. Some examples of external devices include a keyboard, mouse, speaker, external hard drive, external I/O device, and so forth.

Host memory 112 may include volatile memory devices (e.g., random access memory (RAM)), non-volatile memory devices (e.g., flash memory), and/or other types of memory devices.

Host machine 100 includes a host operating system 114 that is used to install and execute software programs. Host machine 100 includes a hypervisor 116 (also known as a virtual machine monitor (VMM)). In the present example, hypervisor 116 is a component of a host operating system 114. In some examples, hypervisor 116 runs on top of a host operating system 114. In other examples, hypervisor 116 runs directly on host hardware 102 without the use of a host operating system 114.

Hypervisor 116 manages access of virtual machines to system resources, such as processor 104, devices 106, 108, 110 and host memory 112. Hypervisor 116, though usually implemented in software, may emulate and export a bare machine interface (host hardware 102) to higher-level software. Such higher-level software may comprise a standard or real-time operating system that may be a highly stripped down operating environment with limited operating system functionality and may not include traditional operating system facilities.

In the present example, the hypervisor provides a virtual machine 118, which is an emulation of host machine 100. Virtual machine 118 can be, for example, a hardware emulation, full virtualization, para-virtualization, and operating system-level virtualization virtual machine.

The term virtual machine generally refers to part of a host system that is visible to a guest (e.g., guest 122). A virtual machine may include, for example, virtual CPUs (e.g., processor 120), one or more virtual devices such as an emulated NIC or disk, physical devices over which a guest is given partial or full control, virtual firmware such as a Basic Input/Output System (BIOS) and/or an Extensible Firmware Interface (EFI), an Advanced Configuration and Power Interface (ACPI), virtual memory (e.g., guest memory 124), and so forth.

In the present example, a guest 122 manages resources of the virtual machine 118. The term "guest" refers to the computer readable instructions run on a hypervisor 116 that is installed on a disk, loaded into memory, or currently running. A guest 122 may include, for example, a copy of firmware in memory, a kernel, an operating system that includes the kernel, additional installed software, a browser, applications running in a browser, and so forth. In one example, a virtual machine 118 running on a host machine 100 may run the same or a different guest operating system as the host operating system 114. Some examples of types of operating systems that may be run include LINUX, UNIX, OS X, WINDOWS, and so forth.

Guest memory 124 is memory allocated to and available for use by a guest 122. In an example, guest memory 124 may be memory presented to guest 122 by hypervisor 116. In one example, guest memory 124 is mapped to corresponding memory from a host machine 100 (e.g., host memory 112). For example, a unit of guest memory 134 may be mapped to and provided using a corresponding unit of host memory 112. A unit of memory generally refers to any subset, portion, piece, range, or region of memory (e.g., guest memory 134, host memory 112). Such "areas of memory" or "memory areas" may be referred to, as pages, blocks, extents, or any other type of measurable unit(s).

In the present example, host memory 112 includes a plurality of pages that are each assigned a host physical address (HPA). The hypervisor 116 maps the HPA to a guest physical address (GPA) of the guest memory 124. The guest 122 maps the GPA to a guest virtual address (GVA). The HPAs, GPAs and GVAs for pages may be stored in mapping data structures that order the pages relative to other pages. A mapping data structure may be, for example, a page table that has page table entries. Each page table entry corresponds to a page. Each page corresponds to an address range, where the addresses are the memory addresses that store data associated with the page. The guest may have a page table that maps from GVAs to GPAs. The host (or a hypervisor running on the host) may have another page table that maps from GPAs to HPAs. The mapping tables for pages may order the pages, such that a first page is executed and then a second page is executed after executing the first page. Each page table entry is associated with bits, such as user bits and valid bits, that are used to restrict or grant access to the pages. User bits distinguish between pages that are accessible in user mode and pages that are accessible in supervisor mode. Valid bits distinguish between usable pages and pages that are not usable.

One or more guest application(s) 126 run on guest 122. In an example, a guest application 126 may be a process or other type of software application that is executed. In one example, a guest application 126 also may refer to a process or application that runs on the guest operating system or a guest kernel.

The kernel or operating system of the guest 122 may typically be executed with greater privileges than guest applications 126 that are run on the guest 122. For example, guest application may be executed in user mode. The kernel and/or operating system may be executed in supervisor mode. Page table entries for pages include the user bit to identify whether the page is accessible to the kernel (or operating system), or to guest applications. In some instances, a guest application 126 may request access to supervisor mode in order to execute code stored on a page that has the user bit cleared. The code on the page may be referred to as "trusted code," as the code is placed in the page by an application other than the guest application 126. For example, the code may be placed in the page by actions of one or more of the guest 122, the hypervisor 116 and/or host operating system 100. In the present example, the actions of the hypervisor 116 and other modules/applications outside of virtual machine 118 (such as host operating system 114) may be referred to as actions of the host. In the present example, the trusted code includes a virtual machine function, which is the code that performs the function that the guest application 126 is attempting to execute. The trusted code may also include code to validate the parameters of the virtual machine function, to verify that the virtual machine function should be executed, prior to executing the virtual machine function.

Figure 2:
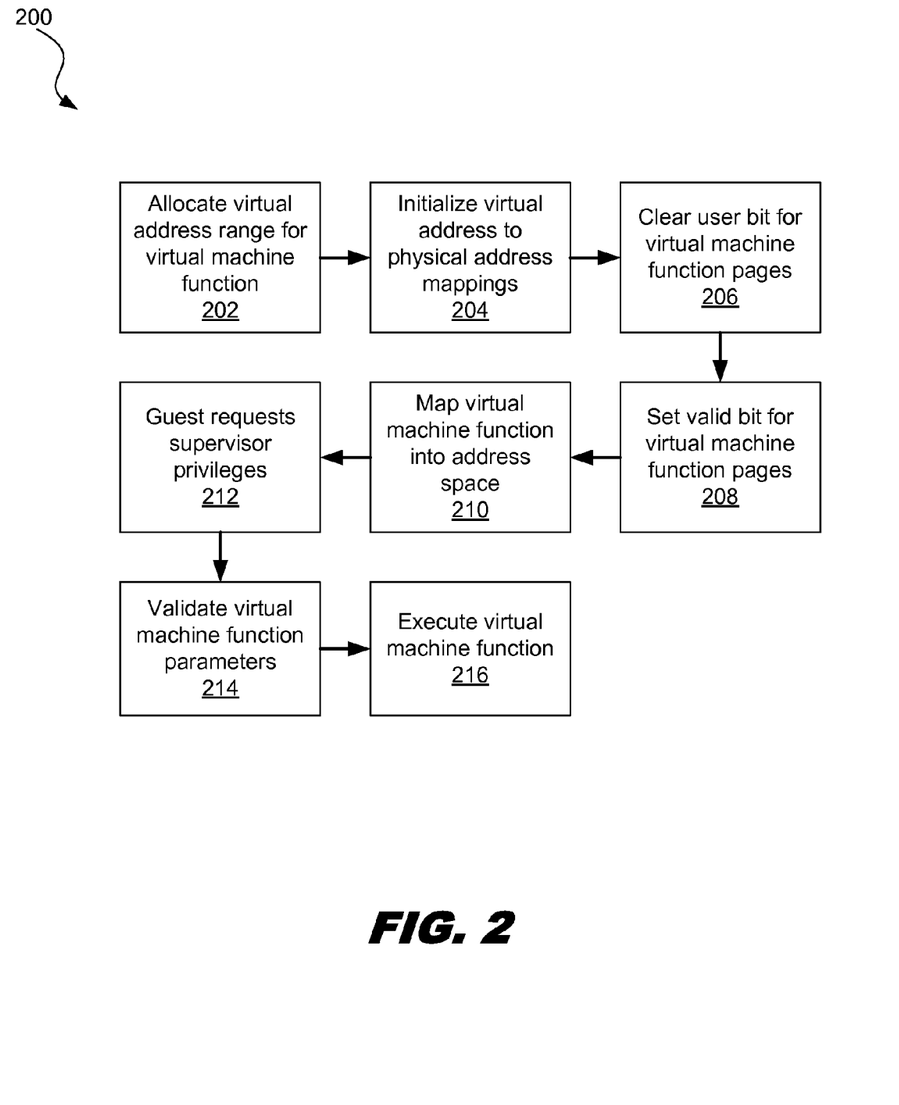
FIG. 2 is a flowchart showing an illustrative access of a protected virtual machine function, in accordance with various examples of the present disclosure.

FIG. 2 is a flowchart showing an illustrative access of a protected virtual machine function. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

In the present example, an application running on the guest, such as a guest or user application has instructions to trigger execution of a virtual machine function. The virtual machine function is to perform some action that the guest application does not have access privileges to perform. For example, the action could include accessing a resource of the hypervisor or host machine. In the present example, the guest application initiates the process using a function call. In other examples, the process is initiated during a boot process by the guest.

At block 202, the guest running on a hypervisor allocates one or more guest virtual addresses for the virtual machine function. In the present example, allocating guest virtual addresses refers to reserving one or more addresses of virtual memory for the virtual machine function, such as by reserving a range of virtual addresses. In some examples, the size of the virtual machine function is determined and the virtual addresses are reserved in the virtual memory based on the determined size. In some examples, virtual address ranges are allocated for a plurality of virtual machine functions. In some examples, allocation of memory may also include error checking pertaining to the virtual memory.

At block 204, the guest initializes the one or more guest virtual address. The initializing includes mapping the guest virtual addresses to guest physical addresses. In the present example, a mapping between the guest physical addresses and the guest virtual addresses is maintained using page tables. Guest virtual address ranges allocated for the virtual machine function may be mapped to contiguous or non-contiguous blocks of physical addresses using the page tables.

In the present example, the allocating and initializing steps are performed during runtime of the guest. However, in some examples, the allocating and initializing steps may be performed during a boot up process, such that the virtual memory for the virtual machine function is already allocated and initialized. Allocating and initializing during a boot process may configure the virtual machine function for faster access during runtime.

The page tables assign the virtual addresses to pages using page table entries. Each page table entry corresponds to a page. A page refers to a subset memory that includes one or more of the virtual addresses. The one or more guest virtual addresses are assigned to one or more pages. A user bit and a valid bit are associated with each page, using the page table entry corresponding to each page.

The user bit identifies whether the page corresponding to the page table entry is accessible by a guest application or is restricted to the kernel or operating system. A user bit that is set identifies that the page is accessible by a guest program as well as the kernel or operating system. A user bit that is cleared identifies that the page is accessible to the kernel or operating system but not to guest programs.

The valid bit identifies whether the page corresponding to the page table entry is usable. "Use" of the page may refer to reading or writing data to the page, where reading data includes reading an instruction in order to execute it. The valid bit is cleared when the page is not yet configured for reading or writing data. The valid bit is set to configure the page for use, such as reading and writing operations performed by the kernel, operating system or guest applications.

At block 206, for each of the page table entries that are initialized for the virtual machine function, the user bit is cleared. In the present example, the user bit is cleared to restrict access to the pages corresponding to the virtual machine function, such that the pages may be accessed in supervisor mode and not by a guest operating in user mode. In other examples, the bit may default to a cleared state. In the present example, the clearing of the user bit is performed by the host, such as by the hypervisor that is running on the host. The host may be triggered by the guest executing a hypercall, where the hypercall may include as parameters the virtual address range that the guest has configured for the virtual machine function.

At block 208, for each of the page table entries that are initialized for the virtual machine function, the valid bit is set. In the present example, the valid bit is set to allow the page to be accessed for writing data. In other examples, the valid bit may default to a set state. In the present example, the setting of the valid bit is performed by the host, such as by the hypervisor that is running on the host. The host may be triggered by the guest executing a hypercall, where the hypercall may include as parameters the virtual address range that the guest has configured for the virtual machine function.

At block 210, the virtual machine function mapped into the guest virtual addresses that are allocated and initialized for the virtual machine function. In some examples, mapping may refer to writing virtual machine function instructions and other virtual machine function data to the virtual addresses. In other examples, mapping may refer to pointing from the allocated and initialized virtual addresses to virtual machine function instructions and data that are stored in other addresses. In the present example, the virtual machine function is mapped into an address space that is accessible to the guest application that triggered the initializing and allocating actions of the guest. In the present example, the mapping of the virtual machine function into the virtual addresses performed by the host, such as by the hypervisor that is running on the host. The host may be triggered by the guest executing a hypercall, where the hypercall may include as parameters the virtual address range that the guest has configured for the virtual machine function.

At block 212, the guest application requests supervisor mode access privileges. The request may be an execution of an instruction, such as a system call. The pages to which the virtual machine function has been mapped have the user bit cleared. Therefore, the guest application (operating in user mode) requests supervisor mode in order for the pages to be accessed. The system call triggers executing of the guest in supervisor mode, where the executing of the pages is now performed by the guest in supervisor mode, rather than by the guest application running in user mode.

At block 214, the guest, which is now running in supervisor mode, may access the virtual machine function to determine the parameters of the virtual machine function. For example, while in supervisor mode the guest may query the hypervisor in order to receive required parameters for the particular virtual machine function. Parameters of the virtual machine function that match the required parameters may be determined to be valid, whereas parameters that are not a match may indicate that the virtual machine function is malicious and should not be executed. Parameters of the virtual machine function may be required to either match or fall into a range of the required parameters in order for the parameters to be determined as valid. In some examples, rather than comparing the parameters to required parameters, the parameters may be compared to unacceptable parameters, where the unacceptable parameters identify parameters that are not allowed. Based on comparing the parameters of the virtual machine function to either the required parameters or the unacceptable parameters, the virtual machine function parameters are determined to be valid or invalid. If the parameters are invalid, the execution of the virtual machine function may be aborted, such as by exiting to the hypervisor, terminating operation of the virtual machine, or returning to user mode execution.

At block 216, if the virtual machine function parameters are valid, then the guest that is in supervisor mode executes the virtual machine function. In the present example, it is the guest that is executing the virtual machine function, and not the hypervisor that is executing the virtual machine function. Having the guest execute the virtual machine function, rather than the hypervisor, may result in performance enhancements by not requiring the overhead of using the hypervisor as an intermediary. In the present example, the virtual machine function includes one one or more instructions for performing a task that a guest or guest application would typically not have access privileges to perform.

In the present example, after executing the virtual machine function, processing may return to the guest application that is operating in user mode.

Figure 3:
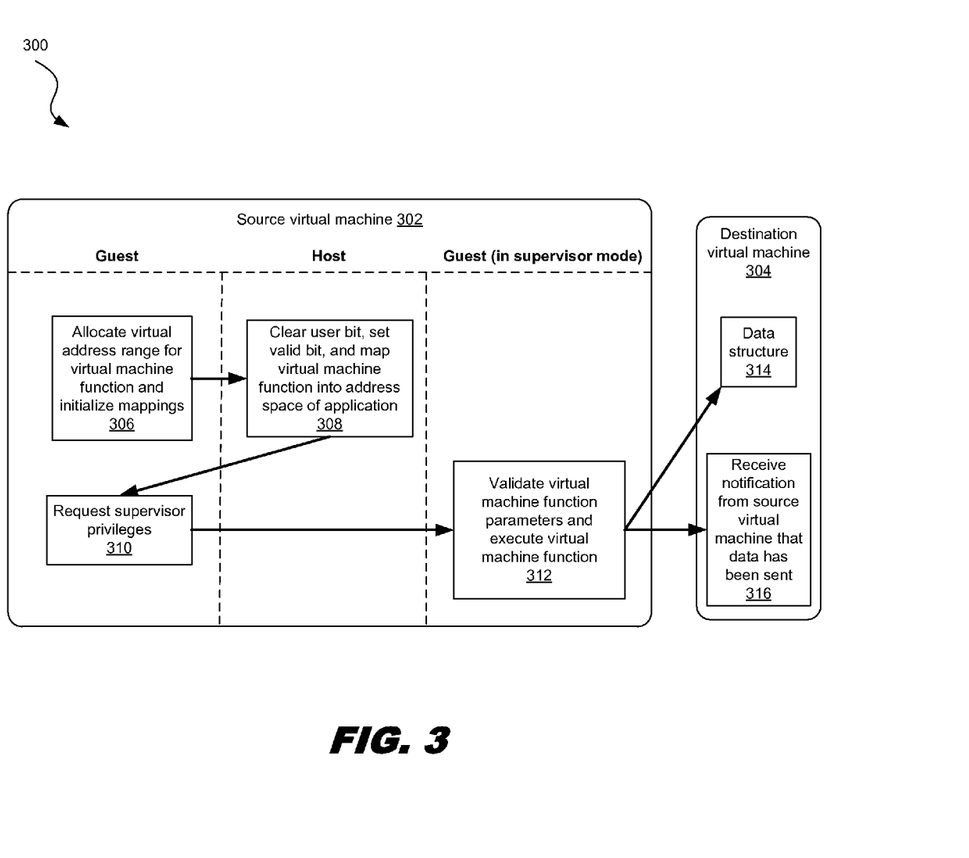
FIG. 3 is a diagram showing an illustrative protected virtual machine function, in accordance with various examples of the present disclosure.

FIG. 3 is a diagram showing an illustrative protected virtual machine function. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

In the illustrated example, a virtual machine function is executed on a source virtual machine 302 in order to modify data on a destination virtual machine 304.

The operation of the guest at block 306 may be referred to as user mode operation, with guest applications executing in user mode and kernel operations executing in supervisor mode.

At block 306, the guest allocates virtual addresses for the virtual machine function and initializes the mappings of the virtual addresses to physical addresses. In some examples, the virtual addresses are a contiguous range that are mapped to either contiguous or non-contiguous physical addresses. The virtual addresses are assigned to one or more page table entries in a page table, in order to define virtual addresses of one or more pages that are reserved for the virtual machine function.

In the present example, the allocating and initializing steps are performed during runtime of the guest. However, in some examples, the allocating and initializing steps may be performed during a boot up process, such that the virtual memory for the virtual machine function is already allocated and initialized. Allocating and initializing during a boot process may configure the virtual machine function for faster access during runtime.

The guest executes a hypercall to trigger further processing by the host. The hypercall may include as a parameter the virtual address range allocated and initiated for the virtual machine function.

At block 308, the host clears the user bit and sets the valid bit for the one or more page table entries. The host maps the virtual machine function into the virtual addresses of the one or more pages. In the present example, the host executes a hypervisor in order to toggle the bits and map the virtual machine function.

At block 310, the guest application requests supervisor mode access privileges by executing a system call instruction.

At block 312, the guest, now operating in supervisor mode, executes the instructions mapping into the pages by the host, in order to validate the virtual machine function parameters and execute the virtual machine function. In the present example, the hypervisor provides a set of stored parameters corresponding to virtual machine functions. The stored parameters may be queried in order to match the parameters of the virtual machine function with the stored parameters and determine whether the parameters of the virtual machine function are valid. The stored parameters may be configured in a data store or other data structure on the host machine that is accessible to the hypervisor.

In the present example, the virtual machine function is configured to place data in a data structure 314 in the memory of the destination virtual machine 304, and to send a notification to the destination virtual machine 304 that the data structure 314 has been updated.

In the present example, the validating of the virtual machine function is a check of the following parameters of the virtual machine function: a source virtual machine parameter, a destination virtual machine parameter, and a size of the data to be placed in the data structure 314. The parameters may be input into a query of the hypervisor, where the query determines whether the parameters are valid.

In the present example, the source virtual machine parameter identifies source virtual machine 302. This parameter is used to query the hypervisor for acceptable parameters for this particular virtual machine function. The hypervisor, in this example, identifies that source virtual machine 302 is a valid source machine for this virtual machine function. The validating of the source virtual machine may restrict the source virtual machine to the particular source virtual machine that initiated the virtual machine function. For example, an unacceptable source virtual machine parameter may be any other source virtual machine other than the source virtual machine that initiated the virtual machine function. Accordingly, the validating may be used to restrict the source virtual machines that are allowed to place data into other virtual machines.

In the present example, the destination virtual machine parameter identifies destination virtual machine 304. This parameter is used to query the hypervisor for acceptable parameters for this particular virtual machine function. The hypervisor, in this example, identifies that destination virtual machine 304 is an acceptable parameter for this virtual machine function. Validating the destination virtual machine parameter may be used to restrict the source virtual machine 302 from placing data on particular other virtual machines.

In the present example, the size parameter identifies the size of the data that is to be placed into data structure 314 by the virtual machine function. The size parameter is input into the query of the hypervisor to determine whether the size falls into an acceptable size range. An unacceptable size may be a size that is larger than the data structure 314 itself. The hypervisor identifies, based on the query, that the data structure 314 is configured with enough space to store data of the size specified by the size parameter. Accordingly, the size parameter is determined to an acceptable parameter.

In the present example, because all of the parameters are determined to be acceptable, the virtual machine function is executed to place the data into the data structure 314 and to notify the destination virtual machine of the sent data.

The notification is received at 316 by the destination machine 304 in order for the destination virtual machine 304 to process the received data.

Figure 4:
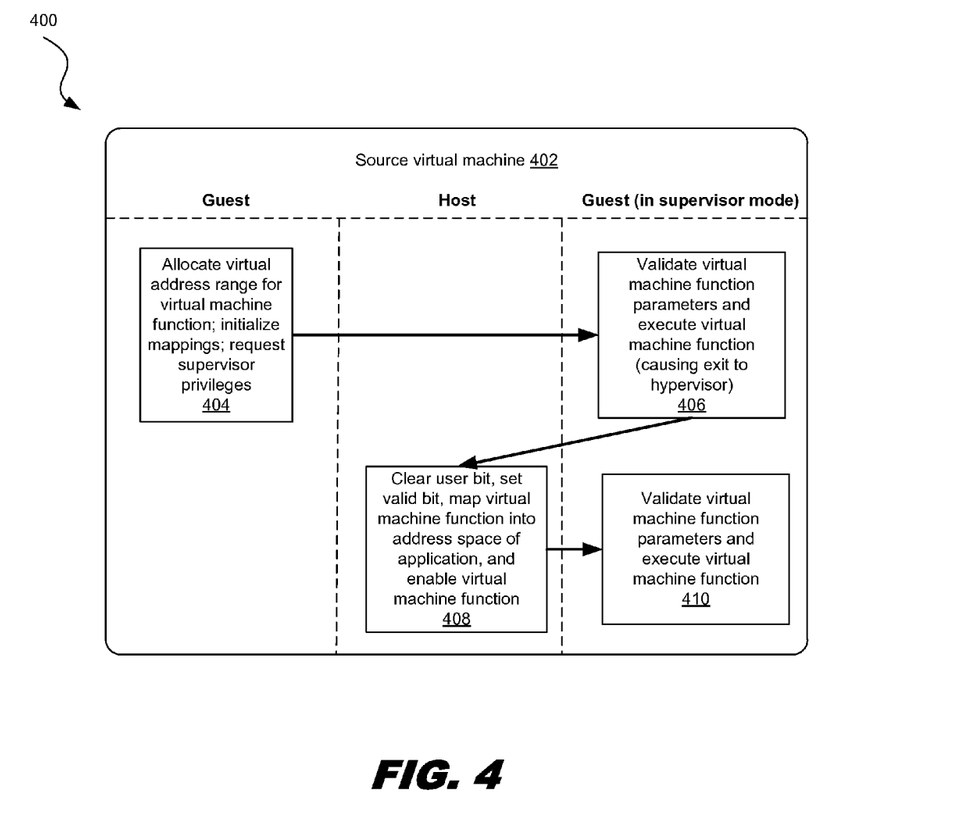
FIG. 4 is a diagram showing an illustrative protected virtual machine function, in accordance with various examples of the present disclosure.

FIG. 4 is a diagram showing an illustrative protected virtual machine function. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

In the present example, the virtual machine function instruction is disabled by default, such that a call of the virtual machine function causes an exit to the hypervisor. Accordingly, the present example provides an example of accessing the protected virtual machine function on a source virtual machine 402, where the virtual machine function is disabled by default.

At block 404, the guest is triggered by a guest application, such that the guest allocates one or more virtual address ranges for the virtual machine function and initializes the mappings of the virtual address range to one or more physical address ranges. After the guest initializes the mappings, the guest application requests supervisor mode.

In the present example, the allocating and initializing steps are performed during runtime of the guest. However, in some examples, the allocating and initializing steps may be performed during a boot up process, such that the virtual memory for the virtual machine function is already allocated and initialized. Allocating and initializing during a boot process may configure the virtual machine function for faster access during runtime.

At block 406, the guest, now operating in supervisor mode, attempts to access the page corresponding to the virtual address range in order execute the code on the page to validate the virtual machine function parameters and execute the virtual machine function. The virtual machine function is disabled, and therefore the attempted execution of the virtual machine function causes an exit from the guest to the hypervisor.

At block 408, the host, such as by executing a hypervisor, clears the user bit and sets the valid bit for one or more page table entries corresponding to the virtual address range(s). The host, such as by executing a hypervisor, maps the virtual machine function into the virtual address ranges and enables the virtual machine function.

At block 410, the guest, still in supervisor mode, again attempts to access the page to validate the virtual machine function parameters and execute the now enabled virtual machine function. This attempt at validating and executing the virtual machine function is successful as the virtual machine function is enabled. Accordingly, the validating and executing is performed without an exit to the hypervisor in this step.

Figure 5:
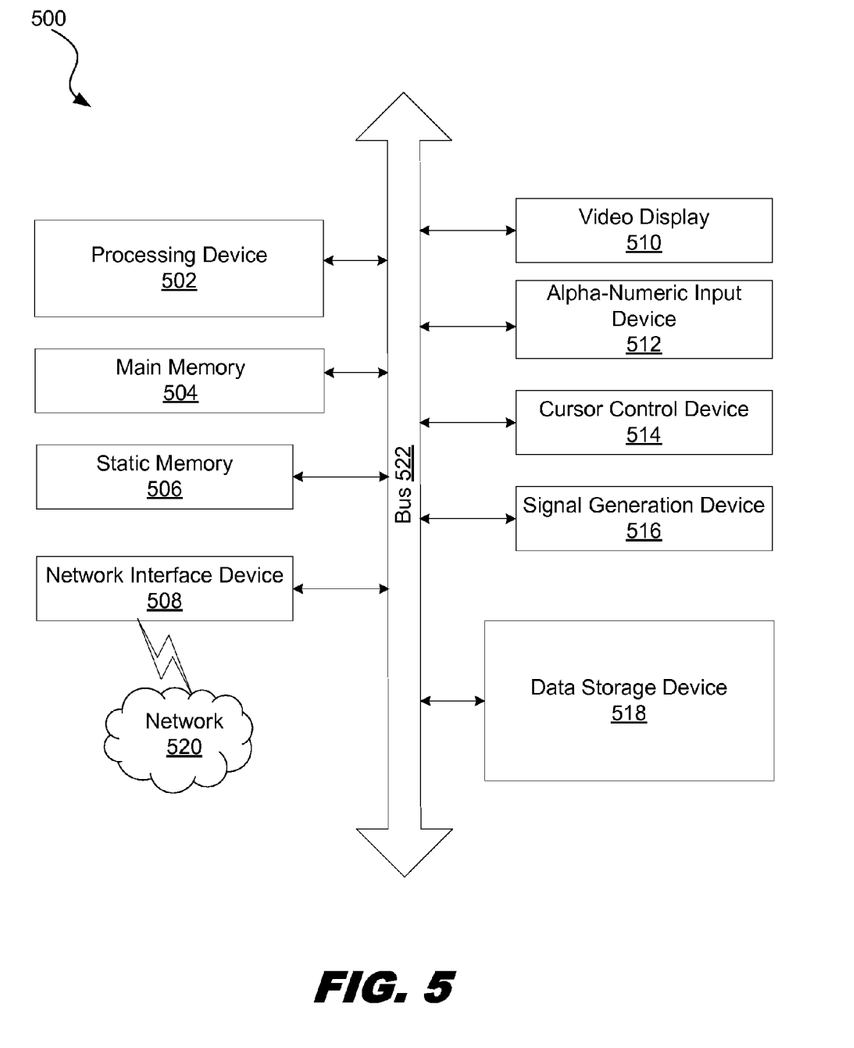
FIG. 5 is a block diagram illustrating a computer system that may perform one or more of the operations described herein, in accordance with various examples of the present disclosure.

FIG. 5 illustrates a diagram of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 522.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium that stores one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for providing protected access, the method comprising:
   allocating one or more guest virtual addresses for a virtual machine function;
   restricting a guest from accessing at least one memory page that corresponds to the one or more guest virtual addresses, wherein the guest runs on a first virtual machine;
   after restricting the guest from accessing the at least one memory page, mapping the virtual machine function to the one or more guest virtual addresses;
   determining, by the guest, at least one parameter of the mapped virtual machine function;
   validating, by a hypervisor, the at least one parameter of the mapped virtual machine function; and
   after the at least one parameter is validated by the hypervisor, executing, by the guest, the virtual machine function to modify data in a data structure of a second virtual machine and send a notification to the second virtual machine that the data structure has been updated.

2. The method of claim 1, the validating comprising:
   querying at least one stored parameter corresponding to the virtual machine function;
   comparing the at least one parameter to the at least one stored parameter; and
   based on the comparing of the at least one parameter to the at least one stored parameter, determining that the at least one parameter is valid.

3. The method of claim 1, further comprising:
   initializing the one or more guest virtual addresses, the initializing including creating a page table entry that associates the one or more guest virtual addresses with a user bit and a valid bit.

4. The method of claim 3, wherein restricting the guest from accessing the at least one memory page includes clearing the user bit to identify the one or more guest virtual addresses as accessible in a supervisor mode and not accessible in a user mode.

5. The method of claim 3, wherein setting the valid bit identifies that the one or more guest virtual addresses are accessible for the hypervisor to perform the mapping of the virtual machine function to the one or more guest virtual addresses.

6. The method of claim 3, wherein the allocating and initializing are performed by the guest.

7. The method of claim 6, wherein the allocating and initializing are performed during a boot process of the guest.

8. The method of claim 6, wherein the guest is run by a host, wherein the host restricts the guest from accessing the at least one memory page and maps the virtual machine function to the one or more guest virtual addresses.

9. The method of claim 1, wherein a first attempt by the guest to execute the virtual machine function causes an exit to the hypervisor without executing the virtual machine function, wherein the hypervisor enables the virtual machine function, and wherein a second attempt by the guest to execute the virtual machine function executes the virtual machine function without exiting to the hypervisor.

10. A non-transitory computer-readable medium for providing a protected virtual machine function, the non-transitory computer-readable medium comprising computer-readable instructions which, when executed by at least one processor, cause the at least one processor to perform operations comprising:
    allocating a virtual address range for a virtual machine function;
    restricting a guest from accessing the virtual address range;
    mapping the virtual machine function to the virtual address range that is restricted from guest access;
    determining, by the guest, a parameter of the mapped virtual machine function;
    validating, by a hypervisor, the parameter of the virtual machine function; and
    after the parameter is validated by the hypervisor, executing the virtual machine function, wherein the virtual machine function is executed on a first virtual machine to modify data corresponding to a second virtual machine that is different than the first virtual machine, and wherein the virtual machine function is executed to send a notification to the second virtual machine.

11. The non-transitory computer-readable medium of claim 10, the validating comprising:
    querying the hypervisor for a stored parameter corresponding to the virtual machine function;
    comparing the parameter to the stored parameter; and
    based on the comparing of the parameter to the stored parameter, determining that the parameter is valid.

12. The non-transitory computer-readable medium of claim 10, wherein restricting the guest from accessing the virtual address range includes providing a user bit and a valid bit that are stored in a page table entry corresponding to a page, and wherein the virtual address range is assigned to the page.

13. The non-transitory computer-readable medium of claim 12, wherein restricting the guest from accessing the virtual address range includes toggling the user bit by clearing the user bit to identify that the page is accessible in supervisor mode and not accessible in user mode.

14. The non-transitory computer-readable medium of claim 12, wherein the valid bit identifies that the page is accessible to store the virtual machine function.

15. The non-transitory computer-readable medium of claim 12, the operations further comprising:
initializing the virtual address range, wherein at least one of the allocating and initializing are performed during a guest boot process, and wherein the hypervisor clears the user bit, sets the valid bit, and maps the virtual machine function.

16. A system comprising:
a memory; and
one or more hardware processors to read instructions from the memory to cause the system to perform operations comprising:
allocating one or more guest virtual addresses for a virtual machine function;
restricting a guest from accessing at least one memory page that corresponds to the one or more guest virtual addresses;
after restricting the guest from accessing the at least one memory page, mapping the virtual machine function to the one or more guest virtual addresses;
determining, by the guest, at least one parameter of the mapped virtual machine function;
validating, by a hypervisor, the at least one parameter of the mapped virtual machine function; and
after the at least one parameter is validated by the hypervisor, executing, by the guest, the virtual machine function,
wherein the guest runs on a first virtual machine,
wherein the virtual machine function is executed by the guest to place data in a data structure of a destination virtual machine, and
wherein the virtual machine function is executed by the guest to send a notification to the destination virtual machine that the data structure has been updated.

17. The system of claim 16, the validating comprising:
querying at least one stored parameter corresponding to the virtual machine function;
comparing the at least one parameter to the at least one stored parameter; and
based on the comparing of the at least one parameter to the at least one stored parameter, determining that the at least one parameter is valid.

18. The system of claim 16, the operations further comprising:
initializing the one or more guest virtual addresses, the initializing including mapping the one or more guest virtual addresses to one or more guest physical addresses and creating a page table entry that associates the one or more guest virtual addresses with a user bit and a valid bit.

19. The system of claim 18, wherein restricting the guest from accessing the at least one memory page includes clearing the user bit to identify the one or more guest virtual addresses as accessible in a supervisor mode and not accessible in a user mode.

20. The system of claim 18, the operations further comprising:
requesting, by the guest, entry into a supervisor mode from a user mode, wherein the executing of the virtual machine function by the guest is performed while the guest is operating in the supervisor mode.

* * * * *